(No Model.)

E. L. SKELTON.
CORN PLANTER.

No. 263,233.  Patented Aug. 22, 1882.

WITNESSES:
Thos. Houghton.
W Read

INVENTOR:
E. L. Skelton
BY
ATTORNEYS.

UNITED STATES PATENT OFFICE.

EDWARD L. SKELTON, OF PARSONS, KANSAS.

CORN-PLANTER.

SPECIFICATION forming part of Letters Patent No. 263,233, dated August 22, 1882.

Application filed May 3, 1882. (No model.)

*To all whom it may concern:*

Be it known that I, EDWARD L. SKELTON, of Parsons, in the county of Labette and State of Kansas, have invented a new and Improved Corn-Planter; and I do hereby declare that the following is a full, clear, and exact description of the same, reference being had to the accompanying drawings, forming part of this specification, in which—

Figure 1:
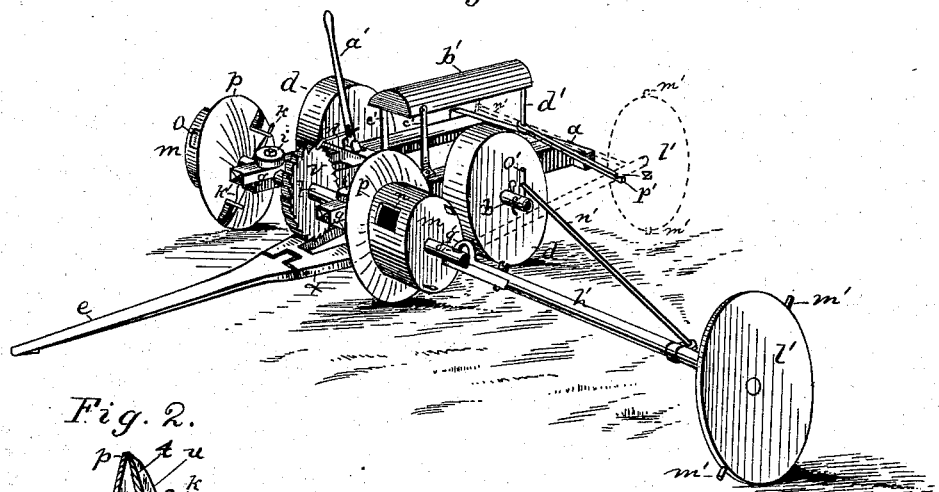
Figure 2:
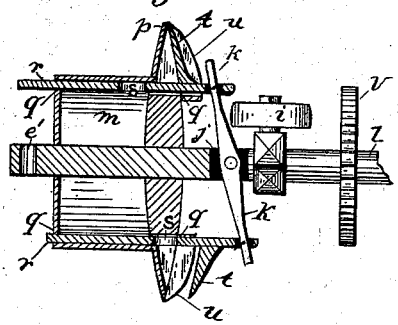
Figure 3:
Figure 4:
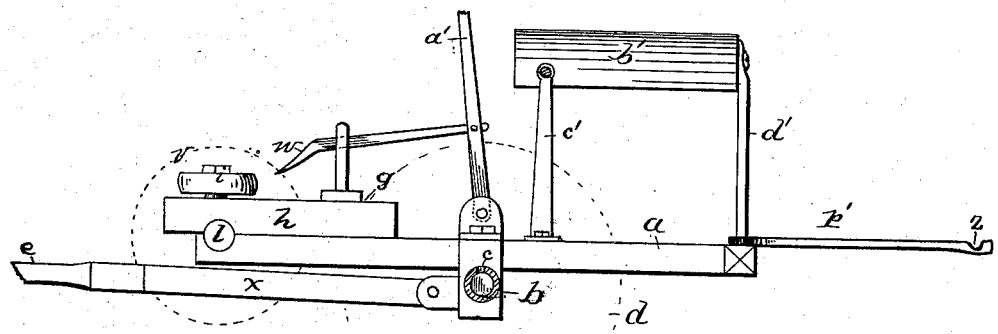

Figure 1 is a perspective view of my improved corn-planter, and Figs. 2, 3, and 4 are detail views.

My invention relates to improvements in corn-planters; and it consists in the peculiar arrangement and construction of the parts, as hereinafter more fully set forth.

In the accompanying drawings, $a$ represents the frame of my improved corn-planter, secured near its middle to the stationary axle $b$, provided near its ends with the holes $c\ c$, the function of which will be hereinafter described.

$d\ d$ represent the wheels of the corn-planter, turning loosely on the fixed axle $b$, and $x$ represents the hounds, pivoted to the axle $b$, and $e$ the tongue, both of the usual construction. The forward end of the frame $a$ is elevated or provided with a supplementary frame, $g$, on the opposite longitudinal bars, $h$, of which are journaled the opposite horizontal friction-rolls, $i$, adapted to engage and force outwardly the levers $k$, pivoted in slots $j$ in the horizontal shaft $l$, journaled in the forward ends of the frame $a$ of the corn-planter.

To the outer ends of the horizontal shaft $l$ are secured the revolving cylindrical hoppers $m$, each provided with an opening, $n$, in its periphery for the introduction of corn into the hopper. The openings $n$ in the hoppers are provided with tight-fitting covers $o$. The inner ends of the revolving cylindrical hoppers $m$ are each provided with a circular flange or revolving circular cutter, $p$, firmly secured to the inner end of the cylindrical hopper or integral therewith, and having a double beveled edge or circumference. The function of the revolving cutters or flanges $p$, secured to the revolving hoppers $m$, fast on the shaft $l$, is to form furrows in the soil for the reception of the seed-corn in the forward movement of the planter, the revolving cutters $p$ resting on the ground. Each cylindrical hopper $m$ is provided with opposite openings, $q$, in its outer and inner heads for the reception of seed-slides $r$, lying diametrically opposite each other and passing through the cylindrical hopper, and adapted to reciprocate in the openings $q$ in the hoppers or seed-receptacles. Each seed-slide $r$ is provided with a pocket, $s$, on its outer face near the inner end of the hopper $m$, and also with an inclined arm, $t$, on its outer face, adapted in the reciprocations of the seed-slides outwardly to fit into the seed chutes or spouts $u\ u$, which convey the corn into the furrows. The inner ends of the seed-slides $r$ of each cylindrical hopper $m$ are pivoted to the ends of the levers $k$, extending equal distances above and below the horizontal shaft $l$ and pivoted in the slots $j$ in the shaft $l$. By this construction, in the forward movement of the planter the furrows are formed by the revolving cutters, and in the revolution of the horizontal shaft $l$, carrying the levers $k$, the upper ends of the latter strike the friction-rolls $i$, and the lower ends of the levers are forced inwardly, drawing the lower seed-slides inwardly, so that their pockets, carrying a number of kernels of corn, lie over the seed spouts or chutes $u$ and fall by gravity down said spouts, now open, into the furrows.

$v$ represents a ratchet-wheel fast on the horizontal shaft $l$, midway, or thereabout, between the revolving cylindrical hoppers $m$.

$w$ is a pawl adapted to engage with the teeth of the ratchet-wheel $v$, and having its rear end hinged to a lever, $a'$, pivoted to the frame, and in close proximity to the driver's seat, so as to be readily operated by him in his seat when desired.

$b'$ represents the driver's seat, which consists preferably of a rounded elongated block, supported on the frame $a$ by the front rods, $c'\ c'$, and rear rod, $d'$.

The extreme ends of the horizontal shaft $l$ are provided with holes $e'$, for the reception of the hook $q'$ on the inner end of the axle $h'$ of the marker $l'$, having the check-pins $m'$ arranged on its circumference.

$n'$ represents a brace pivoted to the axle $h'$ near its outer end, and provided with a hook, $o'$, at its inner end, adapted in the operation of the machine to engage with one of the holes $c$ in the end of the fixed axle $b$.

The marker is attached to the planter by inserting the hook $q'$ of its axle $h'$ in one of the holes $e'$ at the ends of the horizontal shaft $l$ and inserting the hook $o'$ of the brace in one of the holes $c$ in the stationary axle $b$. When it is desired to leave the field or not operate the marker the brace is disengaged from the axle $b$ and the marker and its axle are swung inwardly, so that the axle is supported in a notch, $z$, in a rest, $p'$, pivoted to the rear supporting-rod, $d'$, of the driver's seat, the brace being supported on the frame of the planter. After the field has been once crossed the planter is turned around, so that the tongue is directly over the path made by the marker. The marker is then detached and attached to the opposite side of the machine.

Before commencing to drop the seed it is necessary that the aperture from which the corn is dropped should be in a direct line with the indentation made in the ground by one or other of the check-pins $m'$ on the marker. In order to accomplish this result in case the dropping-aperture and the indentation made by the check-pin are not in line, the driver throws his weight back on his seat, which raises the forward part of the planter off the ground. The driver then, by means of the ratchet-wheel, lever, and pawl, can revolve the cylindrical hoppers $m$ until the dropping-aperture and the indentation made in the ground by the check-pin lie in a direct line.

What I claim as my invention is—

1. The combination, with the frame $a$, friction-rolls $i$, slotted horizontal shaft $l$, and levers $k$, of the revolving cylindrical hoppers $m$, revolving circular cutters $p$, having seed-spouts $u$, and seed-slides $r$, each provided with a pocket, $s$, and inclined arm $t$, and secured to the opposite ends of the levers $k$, substantially as described.

2. The combination, with the horizontal shaft $l$, revolving cylindrical hoppers $m$, and revolving circular cutters $p$, having seed-spouts $u$, of the ratchet-wheel $v$, pawl $w$, lever $a'$, and driver's seat $b'$, all arranged and operated substantially as described.

3. The combination, with the revolving horizontal shaft $l$, having holes $e'$ in its ends, and stationary axle $b$, provided with holes $c\,c$ in its ends, of the marker $l'$, provided with the check-pins $m'$, and axle $h'$, having hook $q'$ on its inner end, and brace $n'$, having hook $o'$, substantially as described.

4. The combination, with the horizontal shaft $l$, having holes $e'$ in its ends, and marker $l'$, provided with the axle $h'$, having hook $q'$, of the pivoted rest $p'$, provided with a notch, $z$, substantially as described, and for the purpose set forth.

EDWARD L. SKELTON.

Witnesses:
F. H. FOSTER,
JAS. GRIMES.